United States Patent
Chatelet et al.

(10) Patent No.: US 11,815,922 B2
(45) Date of Patent: Nov. 14, 2023

(54) MULTIPLE VALVE CONTROL SYSTEM AND METHOD

(71) Applicant: Schlumberger Technology Corporation, Sugar Land, TX (US)

(72) Inventors: Vincent Chatelet, Clamart (FR); Stephane Mainier, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/599,458

(22) Filed: Oct. 11, 2019

(65) Prior Publication Data

US 2021/0109552 A1    Apr. 15, 2021

(51) Int. Cl.
    *G05D 7/06*      (2006.01)
    *G05B 6/02*      (2006.01)
    *G05B 15/02*      (2006.01)

(52) U.S. Cl.
CPC ............ *G05D 7/0623* (2013.01); *G05B 6/02* (2013.01); *G05B 15/02* (2013.01); *G05D 7/0652* (2013.01)

(58) Field of Classification Search
CPC .... G05D 7/0623; G05D 7/0652; G05B 15/02; G05B 6/02; E21B 47/13
USPC ........................................................ 700/282
See application file for complete search history.

(56) References Cited

U.S. PATENT DOCUMENTS

| | | | |
|---|---|---|---|
| 5,358,035 A | 10/1994 | Grudzinski | |
| 5,531,270 A * | 7/1996 | Fletcher | E21B 41/0035 166/53 |
| 5,941,307 A | 8/1999 | Tubel | |
| 6,703,837 B1 * | 3/2004 | Wisler | G01V 3/28 324/338 |
| 8,220,534 B2 | 7/2012 | Millet et al. | |
| 8,441,370 B2 * | 5/2013 | Bonavides | E21B 47/12 340/855.7 |
| 10,214,990 B2 | 2/2019 | Girardi et al. | |
| 2001/0013412 A1 * | 8/2001 | Tubel | E21B 47/16 166/250.01 |
| 2003/0132006 A1 * | 7/2003 | Bussear | E21B 34/16 166/250.15 |

(Continued)

FOREIGN PATENT DOCUMENTS

| | | |
|---|---|---|
| CN | 106321016 A | 1/2017 |
| EP | 0200535 A2 | 11/1986 |
| WO | 2018145215 A1 | 8/2018 |

*Primary Examiner* — Robert E Fennema
*Assistant Examiner* — Christopher W Carter
(74) *Attorney, Agent, or Firm* — Jeffrey D. Frantz (57) ABSTRACT

Aspects of the present disclosure relate to a valve control system. The valve control system may include a transmitter and a plurality of valve controllers that each have a receiver. Each valve controller of the plurality of valve controllers is configured to control a respective valve of a plurality of valves. In some embodiments, the transmitter may transmit an electromagnetic signal that includes an encoded message to be decoded by a processor of each valve controller of the plurality of valve controllers. In some examples, the encoded message may include a synchronization message, an instruction message, an error correction message, an encryption message, or any combination thereof that enables the plurality of valve controllers to adjust the plurality of valves to respective target positions.

20 Claims, 4 Drawing Sheets

(56) References Cited

U.S. PATENT DOCUMENTS

| | | | |
|---|---|---|---|
| 2006/0131014 A1* | 6/2006 | Huang | E21B 47/12 |
| | | | 166/250.07 |
| 2007/0204995 A1* | 9/2007 | Hofman | E21B 43/14 |
| | | | 166/308.1 |
| 2007/0272411 A1* | 11/2007 | Lopez De Cardenas | ...... |
| | | | E21B 43/26 |
| | | | 166/305.1 |
| 2008/0027586 A1* | 1/2008 | Hern | G01K 13/00 |
| | | | 700/284 |
| 2008/0269951 A1* | 10/2008 | Boger | G05D 7/0635 |
| | | | 700/282 |
| 2011/0030963 A1* | 2/2011 | Demong | E21B 43/26 |
| | | | 166/313 |
| 2015/0377013 A1* | 12/2015 | Lerner | G05D 7/0629 |
| | | | 340/854.3 |
| 2016/0356133 A1* | 12/2016 | Hamid | E21B 34/10 |
| 2018/0087374 A1* | 3/2018 | Robson | H04Q 9/00 |

* cited by examiner

MULTIPLE VALVE CONTROL SYSTEM AND METHOD

BACKGROUND

This disclosure relates generally to downhole tools and more specifically to techniques for controlling downhole closure devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological formation is a remarkably complex endeavor. During certain operations, such as well production operations, some downhole conditions (e.g., high pressure conditions) may result in a flow of formation fluid from a geological formation propagating toward a surface. In many instances, a downhole closure device may be lowered into a production casing or tubing of a wellbore within the geological formation wellbore (e.g., proximate the surface, 10 meters (m) from the surface, 100 m from the surface, 500 m from the surface, or 1000 m from the surface) to prevent the flow of the formation fluid from propagating toward the surface. More specifically, the downhole closure device may include one or more valves that selectively direct, reduce, and/or block the flow of formation fluid.

SUMMARY

A summary of certain examples disclosed herein is set forth below. It should be understood that these aspects are presented merely to provide the reader with a brief summary of these certain examples and that these aspects are not intended to limit the scope of this disclosure. Indeed, this disclosure may encompass a variety of aspects that may not be set forth below.

One example of the present disclosure relates to a system. The system includes a plurality of closure devices each having a valve and a valve controller communicatively coupled to the valve. The valve of each closure device of the plurality of closure devices selectively directs a fluid through a respective downhole closure device. The system also includes a transmitter configured to transmit an electromagnetic signal, where the electromagnetic signal includes data indicative of a respective target position of the valve of each closure device of the plurality of closure devices. Further, each valve controller includes one or more tangible, non-transitory, machine-readable media having instructions be executed by a processor. The instructions cause the processor to receive the electromagnetic signal from the transmitter via a receiver of the valve controller. The instructions also cause the processor to identify the data indicative of the respective target position of a respective valve associated with the valve controller by decoding the electromagnetic signal. Further, the instructions cause the processor to modify the position of the respective valve associated with the valve controller based on the data.

Another example of the present disclosure relates to a method. The method includes receiving an electromagnetic signal via a valve controller of a first well closure device. The electromagnetic signal includes data indicative of a first target position of a first valve of the first well closure device and a second target position of a second valve of a second well closure device. The method also includes identifying, via a processor of the valve controller, a synchronization message of the electromagnetic signal. Further, the method includes decoding, via the processor of the valve controller, the electromagnetic signal to output a decoded message based on the synchronization message. Further still, the method includes identifying, via the processor of the valve controller, the first target position of the first valve of the first well closure device based on the decoded message. Even further, the method includes outputting, via the processor of the valve controller, an actuation signal to adjust a position of the first valve toward the first target position based on the decoded message.

Another example of the present disclosure relates to a valve control system. The valve control system includes one or more tangible, non-transitory, machine-readable media having instructions configured to be executed by a processor. The instructions cause the processor to receive an input indicative of a plurality of target positions of a plurality of valves. Each valve of the plurality of valves is communicatively coupled to a respective valve controller of a plurality of valve controllers. Additionally, each valve of the plurality of valves is associated with a respective well closure device of a plurality of well closure devices. The instructions also cause the processor to generate an electromagnetic signal based on the input, where the electromagnetic signal includes data indicative of the plurality of target positions of the plurality of valves. Further still, the instructions cause the processor to transmit the electromagnetic signal to each valve controller of the plurality of valve controllers.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated examples may be incorporated into any of the above-described aspects of the present disclosure alone or in any combination. The brief summary presented above is intended to familiarize the reader with certain aspects and contexts of examples of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various examples of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one example" or "an example" of the present disclosure are not intended to be interpreted as excluding the existence of additional examples that also incorporate the recited features.

As mentioned above, a downhole closure system may include one or more downhole closure devices each having a valve and a corresponding valve controller. The valves may be controlled independently from one another and may be positioned in various locations, such as within two different tubings of the same well or in different wells. The valve of the one or more downhole closure devices may block a flow of formation fluid from reaching a surface located above a geological formation. The downhole closure system also has a valve control system that communicates with the valve controllers of each downhole closure device to control a respective position of a valve (e.g., open, close, or maintain in a current position). The valve control system may include a transmitter that directs a signal to a plurality of receivers of the valve controllers. Each valve controller, and thus each receiver, is associated with a respective valve of a downhole closure device. Existing valve control systems may control a position of a single valve based on whether or not there is communication between a transmitter and a receiver associated with the single valve. That is, the transmitter of the valve control system may transmit an electromagnetic (EM) signal encoded with a message (e.g., via frequency modulation of the EM signal) indicating a target position of the valve (e.g., opened or closed) to a receiver of the valve controller. The valve controller may be configured to decode the message (e.g., via a look-up table stored in a memory of the valve controller) to determine and adjust the valve to the target position. In some cases, the valve controller may maintain a position of the valve or be configured to modify the position of the valve to a predetermined target position (e.g., a default position) in response to an interruption in the EM signal In particular, a valve of a downhole closure system that is designed to prevent any unintended flow to the surface may include a biasing member (e.g., a spring) that biases the valve to a closed position (e.g., the default position) when the valve controller of the valve is not receiving the EM signal.

At least in some instances, the valve controller may improperly decode the message, which may cause the valve controller to adjust the valve to an incorrect position (e.g., a position other than the target position). To reduce a likelihood of improperly decoding the message, the EM signal may be encoded with a repeated sequence of the message (e.g., the target position). Accordingly, the valve controller may adjust the position of the associated valve once the valve controller has decoded the repeated sequence and determined that the message is present within the repeated sequence a threshold number of times. Decoding the repeated sequence of the message increases the processing time of the valve controller, and thus, the response time of adjusting the valve also increases (e.g., the amount of time between transmission of the EM signal and actuation of the valve). Put differently, while the repeated sequence may reduce errors in controlling the operation of the valve, the repeated sequence may cause a delay (e.g., 30 seconds, 1 minute, 2 minutes, etc.) in changing the position of the valve. Moreover, existing valve control systems may not be suitable for controlling multiple valves with a single transmitter because the length of multiple repeated sequences in a single signal further increases the processing time to decode, and thus, increases the delay for adjusting the valve position.

Accordingly, the present disclosure relates to a downhole closure system including a plurality of valves (e.g., each associated with a respective downhole closure device) disposed in one or more wellbores and including a valve control system to control the plurality of valves and to reduce the processing time and response time for actuating the plurality of valves. In general, the valve control system includes a transmitter and a plurality of valve controllers each associated with a valve of the plurality of valves. In some examples, the transmitter may be disposed on a surface above the geological formation, and thus, above the wellbore. The transmitter is configured to transmit EM signals that are encoded with a message indicative of a target position for each valve of the plurality of valves. Each valve controller (e.g., communicatively coupled to an actuator associated with a valve of the plurality of valves) includes a receiver configured to receive the transmitted EM signals and a processor configured to decode the EM signals to determine the message and adjust the position of the respective valve to a target position. In some examples, the valve control system may generate the EM signals based on sensor data acquired from the wellbore (e.g., pressure, flow rate, and the like) or the surface (e.g., relatively high ambient temperatures). In some examples, the encoded message of the EM signals may include a synchronization portion that indicates when and/or where the receiver should begin decoding the encoded message. In some examples, the encoded message may include an error detection and/or error correction portion that increases the reliability of the receiver to decode the message without having to repeat the message (e.g., include a repeated sequence of the message). In this way, the message does not need to be repeated and the time to actuate the valve may be shorter than in existing valve systems, while enabling control of each valve of the plurality of valves. As such, the valve control system of the present disclosure may reduce the processing time and the delay for determining respective target positions for the plurality of valves as well as reduce the response time for actuating the plurality of valves to the respective target positions.

Figure 1:
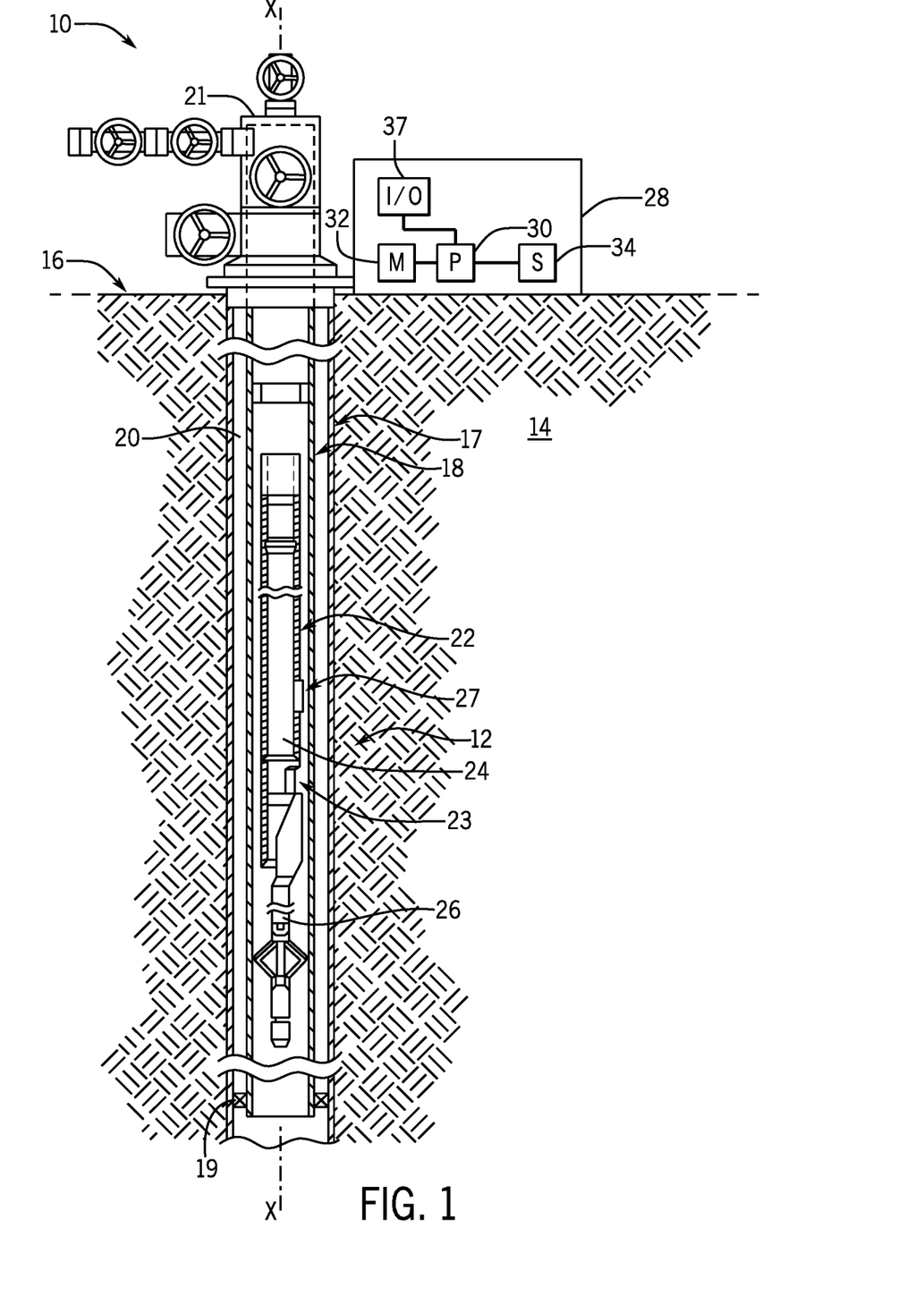
FIG. 1 is a partial cross-sectional view of an example of a downhole closure device suspended into a subsurface formation, in accordance with an aspect of the present disclosure.

With the foregoing in mind, FIG. 1 illustrates a well closure system 10 that may employ the systems and methods of this disclosure to control and/or operate multiple valves of the well closure system 10. As discussed herein, one or multiple closure devices 12 may be lowered into a wellbore 16 (e.g., installed and anchored within the wellbore 16) prior to certain operations, such as well production. The closure device 12 may be lowered into the wellbore 16 to replace another closure device 12, add an additional closure device 12, or if the wellbore 16 does not contain an existing closure device 12. In any case, the closure device 12 is configured to block a flow of formation fluid from reaching a surface located above a geological formation 14 (e.g., via conduits such as a casing conduit 17 and/or a production casing conduit 18), which may result from high pressure conditions that arise during well production. The closure device 12 may include a valve 23, such as a subsurface valve. As shown in this configuration of the wellbore 16, the wellbore completion includes a casing conduit 17 and a production casing conduit 18 (e.g., production tubing) with an annular sealing element 19 that seals an annular space 20 defined between the casing conduit 17 and the production casing conduit 18. The wellbore 16 may include a wellhead 21 at the surface of the well closure system 10 that may selectively seal the casing conduit 17 and/or the production casing conduit 18.

In the illustrated example of FIG. 1, the closure device 12 includes a valve housing 22 having a valve 23, an actuation subsystem 24 (e.g., an actuator), and a valve controller 26. The closure device 12 is sealed in the production tubing by a sealing element so that the fluid may not reach the surface if it does not pass through the valve 23. The valve 23 includes a flapper that can switch between an open position to enable fluid flow and a closed position to block the fluid flow. The actuation subsystem 24 includes a biasing component 27 (e.g., a pressurization piston coupled to a spring) to maintain the valve 23 in a default position (e.g., open or closed). As discussed in more detail below with regard to FIG. 2, the valve controller 26 is configured to control and/or adjust a position of components of the valve housing (e.g., the valve 23) via the actuation subsystem 24 to block the flow of formation fluid from reaching the surface or to enable the fluid to flow toward the surface.

It should be noted that the actuation subsystem 24 and the valve housing 22 may be configured to operate without use of hydraulic or electrical control lines extending from the surface into the wellbore 16. Furthermore, powering the actuation subsystem 24, or more specifically, the components of the actuation subsystem 24 (e.g., electrical components, actuators, and the like) with electrical control lines may create additional complexity when running the electrical control lines from the surface into the wellbore 16. Instead, the actuation subsystem 24 may be powered by alternate power supplies, such as a battery pack.

The illustrated embodiment of the closure device 12 includes the valve controller 26 that may be utilized to adjust the position of the components of the valve housing 22. As discussed in more detail below, with regard to FIG. 2, the valve controller 26 controls and/or adjusts a position of the valve 23 (e.g., via the actuation subsystem 24). Further, the valve controller 26 may control and/or adjust the valve 23 based on received encoded messages that are transmitted by a transmitter of a transmitter subsystem 28 based on received input (e.g., provided by a sensor and/or an operator), as discussed in more detail below, with regard to FIG. 2.

In some embodiments, the transmitter subsystem 28 may receive sensor measurements (e.g., temperature sensor measurements, pressure sensor measurements, flow-rate sensor measurements, another suitable parameter, or any combination thereof). The sensor measurements may be directed by surface sensors, downhole sensors, or completion sensors to the transmitter subsystem 28 via any suitable telemetry (e.g., via electrical signals pulsed through the geological formation 14 or via mud pulse telemetry). In other embodiments, the transmitter subsystem 28 may receive inputs from a user interface controlled by an operator. The transmitter subsystem 28 may process the sensor measurements and/or user inputs to determine a condition within the wellbore 16 or at the surface and determine whether to adjust the position of valve 23 based on the condition of the wellbore 16 and/or the surface.

To this end, the transmitter subsystem 28 may be any electronic data processing system that can be used to carry out the systems and methods of this disclosure. For example, the transmitter subsystem 28 may include a processor 30, which may execute instructions stored in memory 32 and/or storage 34. As such, the memory 32 and/or the storage 34 of the transmitter subsystem 28 may be any suitable article of manufacture that can store the instructions. In some embodiments, the memory 32 is a tangible, non-transitory, machine-readable-medium that may store machine-readable instructions for the processor 30 to execute. The memory 32 may include ROM, flash memory, a hard drive, or any other suitable optical, magnetic, or solid-state storage medium, or a combination thereof. The memory 32 may store data, instructions, and any other suitable data. Additionally, the transmitter subsystem 28 may include an input/output (I/O) port 37, which may include interfaces coupled to various components such as input devices (e.g., keyboard, mouse), input/output (I/O) modules, sensors (e.g., surface sensors and/or downhole sensors), and the like. For example, the I/O port 37 may include a display (e.g., an electronic display) that may provide a visualization, a well log, or other operating parameters of the geological formation 14, the wellbore 16, or the surface to an operator, for example. In this embodiment, the data processing system has been represented at the well site. However, all or part of the transmitter subsystem 28 (e.g., all or part of the processor, the display, the memory, etc.) may be situated remotely from the well site and configured to communicate with the well site via a network connection. It should be noted that, at least in some instances, all or part of the data processing system may be cloud-based.

Figure 2:
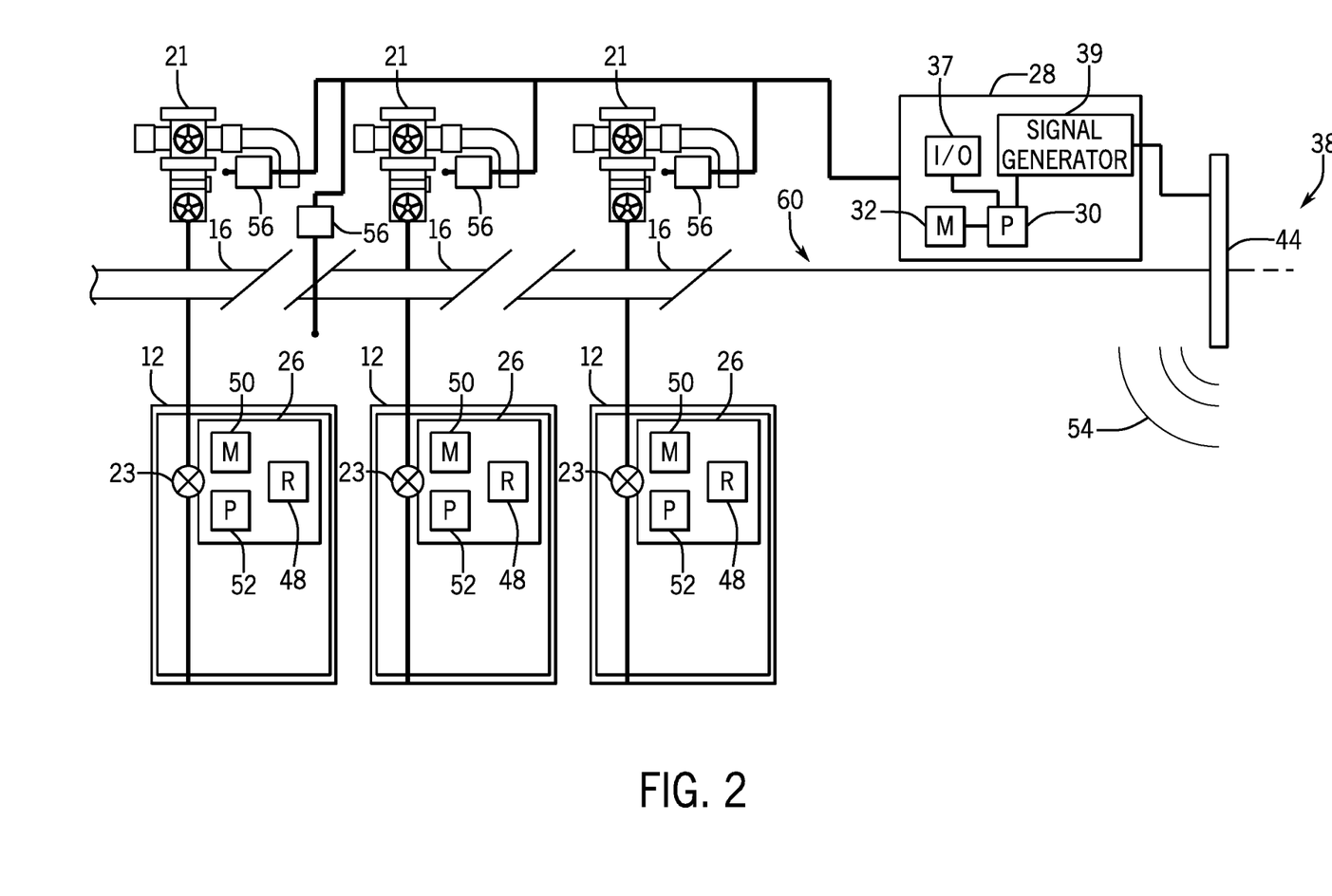
FIG. 2 is a perspective view of an example of multiple downhole closure devices each having a valve with a respective valve controller that may be communicatively coupled to a control system, in accordance with an aspect of the present disclosure.

With the foregoing in mind, FIG. 2 is a schematic of a valve control system 38 that may be used to control the operation of the valve 23 (e.g., disposed within the valve housing 22) disposed along a flowline 42 of each of the closure devices 12. As shown in the illustrated example of FIG. 2, three wellbores 16 each include a respective closure device 12. It should be noted that, at least in some instances, each wellbore 16 may include an additional closure device 12 (e.g., disposed within a separate tubing at a different depth within the wellbore 16). Additionally, as shown in the illustrated example of FIG. 2, the transmitter subsystem 28 of the valve control system 38 includes a signal generator 39 and an antenna 44 that transmits an EM signal 54 based on a command or instructions received from the signal generator 39. Additionally, the valve control system 38 includes a plurality of valves 23 that each include a respective valve controller 26. Each valve controller 26 includes a receiver 48, memory 50, and a processor 52. The memory 50 may store information such as control software, look up tables, configuration data, etc. The memory 50 may include a volatile memory, such as random access memory (RAM), and/or a nonvolatile memory, such as read-only memory (ROM). The memory 50 may store a variety of information and may be used for various purposes. For example, the memory 50 may store processor-executable instructions including firmware or software for the processor 52 to execute. In some examples, the memory 50 is a tangible, non-transitory, machine-readable-medium that may store machine-readable instructions for the processor 52 to execute. The memory 50 may include ROM, flash memory, a hard drive, or any other suitable optical, magnetic, or solid-state storage medium, or a combination thereof. The memory 50 may store data, instructions, and any other suitable data.

As discussed in more detail below, the antenna 44 is capable of communicating an encoded message generated by the transmitter subsystem 28 (e.g., the signal generator 39) to the receiver 48 via the electromagnetic (EM) signal 54 from surface into the wellbore 16. The encoded message may be decoded by the valve controller 26, which may then adjust a position of the associated valve 23 (e.g., via an actuator) based on the decoded message. In some embodiments, the valves 23 may be biased (e.g., via a spring) toward a closed position such that the valves are configured to close in the absence of a signal directed to the receiver 48 via the antenna 44 of the transmitter subsystem 28.

The illustrated example of the valve control system 38 also includes one or more sensors 56. Additionally or alternatively, the sensors 56 may be disposed in other downhole devices other than the downhole closure device 12 (e.g., pressure and/or temperature gauges) or at the surface. In some examples, the sensors 56 may be temperature sensors, pressure sensors, ultrasonic sensors, spectroscopic sensors, flow rate sensors, and/or other suitable sensors for providing feedback indicative of conditions within the wellbore 16. Additionally or alternatively, the sensors 56 may be disposed along the flowline 42 of the closure device 12 and/or positioned on the wellhead 21 disposed at a surface 60 of the closure device system 10.

In some examples, the one or more sensors 56 may provide feedback to the transmitter subsystem 28 (e.g., processor 30), which may be used by the signal generator 39 to generate the encoded message that is sent to the valve controllers 26 of the downhole closure devices 12 and ultimately adjusts positions of one or more of the plurality of valves 23. As mentioned above, each valve of the plurality of valves 23 is communicatively coupled to a respective valve controller 26. As such, the respective valve controllers 26 may be configured to adjust a position of the corresponding valve 23 based on downhole conditions of the wellbore 16 (e.g., feedback indicative of downhole conditions received from the sensors 56). That is, an actuator of the corresponding valve 23 may adjust the valve 23 toward an open position, adjust the valve 23 toward a closed position, and/or maintain a position of the valve 23 based on feedback indicative of the downhole conditions of the wellbore 16, such as pressure, temperature, another suitable operating parameter, or any combination thereof.

In the illustrated example of FIG. 2, the antenna 44 is electrically coupled to the transmitter subsystem 28. As such, the transmitter subsystem 28 may generate the encoded message to be transmitted by the antenna 44 to the valve controller 26 (e.g., the receiver 48) based on the feedback provided by the sensors 56. Additionally or alternatively, the transmitter subsystem 28 may generate the message to be encoded based on received user input, such as input received via an input/output device 62 (e.g., the I/O port 37).

As discussed herein, the valve controller 26 may adjust the position of the associated valve 23 based on the encoded message. More specifically, the encoded message includes data that, when decoded by the processor 52 of the valve controller 26, instructs the valve controller 26 to adjust the position of the valve 23. The encoded message generated by the signal generator 39 is sent to the antenna 44, which transmits the encoded message in the EM signal 54 to the valve controllers 26, and the encoded message includes instructions for the valve associated with each of the valve controllers 26. Each valve controller 26 may decode the instructions intended for the respective valve 23 associated with the valve controller 26 and actuate the valve 23 according to the instructions without delaying the actuation of any of the remaining valves. In this way, the footprint of the system is reduced, as only one transmitter subsystem 28 is needed for multiple closure devices 12, instead of a transmitter subsystem 28 for each closure device 12.

Figure 3:
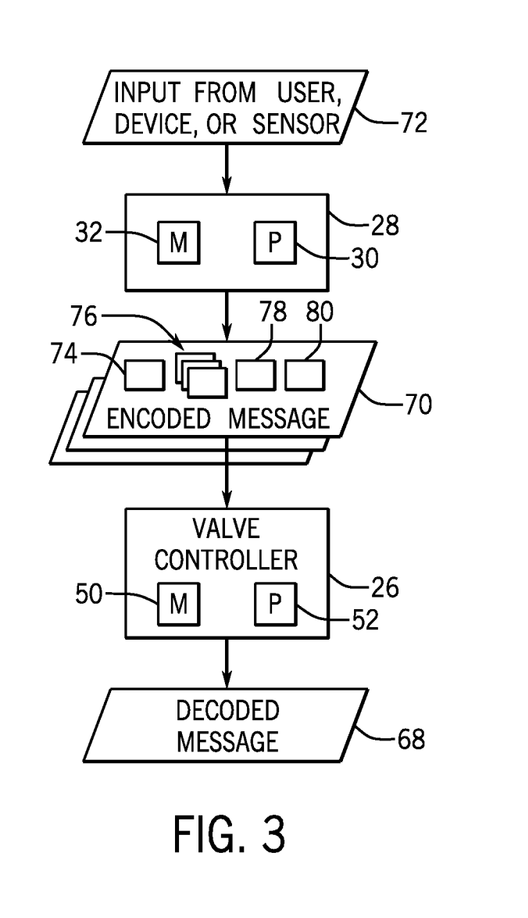
FIG. 3 is a flow chart of an example of a process for transmitting an encoded message via an electromagnetic (EM) signal from the control system toward the downhole closure device, in accordance with an aspect of the present disclosure.

To further illustrate an example of decoding the encoded message transmitted by the antenna 44, FIG. 3 is a flow diagram of a process 66 for generating a decoded message 68 in response to receiving an encoded message 70. In general, the illustrated example of the process 66 includes receiving an input 72 indicating that a position of one or more valves should be modified. For example, the input may be instructions provided by an operator (e.g., via the I/O port 37 and/or the input/output device 62) to close one or more of the valves 23 associated with the closure devices 12. In some embodiments, the input 72 may be feedback from the sensors 56 received by the transmitter subsystem 28, which then generates the encoded message 70 based on the feedback. In any case, the valve controller 26 receives the encoded message 70 and outputs the decoded message 68, which is based on the feedback from the sensors 56 and/or user input used to generate the encoded message 70. As shown in the illustrated example of the process 66, the transmitter subsystem 28 may output more than one of the encoded messages 70. In some examples, the transmitter subsystem 28 may output multiple encoded messages 70 that are transmitted (e.g., via the antenna 44) at different frequencies. For example, each valve controller 26 may be configured to decode a received EM signal at a certain frequency. In this way, the antenna 44 may transmit an encoded message 70 for a particular valve 23, which may have less information (e.g., data) to be decoded by the processor 52 of the valve controller 26 associated with a given frequency when compared to a single encoded message that is configured to control more than one of the valves 23. Utilizing individual encoded messages 70 at different frequencies may reduce, minimize, or prevent any interference from third-parties.

In the illustrated example of the process 66, the encoded message 70 includes a synchronization message 74, one or more instruction messages 76 (e.g., each instruction message of the one or more instruction messages 76 being associated with a particular valve), an error reduction message 78, and an encryption message 80. It should be noted that, at least in some examples, the encoded message may include one or any combination of the synchronization message 74, the one or more instruction messages 76, the error reduction message 78, and the encryption message 80. The synchronization message 74 generally facilitates decoding by the processor 52 by including a target sequence of data (e.g., bits of data) indicating where and/or when the processor 52 should begin decoding the encoded message 70. For example, the synchronization message 74 may include any suitable target sequence of data such as a Barker Code, a Gold Code, and the like, that indicates to the processor where the one or more the instruction messages 76 begin.

The one or more instruction messages 76 may include information indicative of commands for actuating the valves 23. In some examples, the encoded message 70 may include an instruction message 76 for each valve 23, which may be designated by a position of the instruction message 76 associated with a particular valve 23 within the encoded message 70 (e.g., an address). For example, each instruction message 76 may be indicative of a command for adjusting a position of a respective valve 23 (e.g., adjust the valve toward a closed position, adjust the valve toward an open position, and/or maintain a position of the valve) represented by two bits of data in a binary code format. For example, while a valve controller 26 associated with a valve 23 may receive multiple instruction messages 76 that are associated with different valves 23, the valve controller 26 may be configured to determine the instruction message 76 addressed to the valve 23 associated with the valve controller 23 based on, for example, the order of the instruction messages 76 in the encoded message.

In some examples, the encoded message 70 may be generated in response to feedback from the sensors 56 indicating that one or more valves of the plurality of valves 23 should be adjusted. The one or more instruction messages 76 are generally repeated as long as the instructions for all the valves 23 remain valid (e.g., the one or more instruction messages 76 are repeated until a position of at least one of the valves 23 should be changed). In some examples, the synchronization message 74 may not be included in every encoded message 70. For example, a clock frequency difference (e.g., a relatively small difference in clock frequency) between the transmitter subsystem 28 and the valve controller 26 in the wellbore 16 may create a drift (e.g., a bit slip) in the synchronization message 74, which may result in the valve controller 26 incorrectly decoding the synchronization message 74 and/or not being able to detect the synchronization message 74. Sending the one or more instruction messages 76 multiple times and periodically may enable the drift to be negligible, such that the drift does not cause incorrect decoding of the encoded message 70. Additionally or alternatively, the synchronization message 74 may be included periodically (e.g., every minute, every 2 minutes) in the encoded messages 70 to account for the clock difference and avoid the drift in the synchronization message 74. Further still, the synchronization message 74 may include a fine synchronization portion, such as an autocorrelation with modulated bits, which may account for any delay between transmission of the encoded message by the antenna 44 and receipt of the encoded message by the receiver 48 of the valve controller 26.

In some examples, the one or more instruction messages 76 may include data indicative of actuating a subset of valves (e.g., at least two valves) of the plurality of valves 23, and thus, further compact the amount of information (e.g., data) transmitted via the encoded message 70. For example, 3-bits of data may be used to provide instructions to the valve controllers 26 for controlling two valves of the plurality of valves 23 (e.g., valve A and valve B) associated with a respective valve controller 26. In some examples, the one or more instruction messages 76 may include binary code data, where each bit of data is represented as a "1" or a "0." A three-bit binary code within the one or more instruction messages 76 may provide a unique instruction to two valve controllers 26 that control two respective valves of the plurality of valves 23 (e.g., the valve 23 associated with each valve controller 26). As should be understood, a three-bit binary code may include 8 unique sequences (e.g., $2^3=8$), where each sequence represents instructions for the two valves of the plurality of valves. That is, an instruction message 76 of "001" may represent a first command to close valve A and initiate opening of valve B; an instruction message 76 of "010" may represent a second command to initiate opening of both valve A and valve B; an instruction message 76 of "011" may represent a third command to keep valve A open and to initiate opening of valve B; an instruction message of '100' may represent a fourth command to keep both valve A and valve B open; and so forth. It should be noted that certain combinations of commands for the two valves may be duplicative, and as such, may be omitted. As such, with the example described above, 8 bits may be sufficient to cover a subset of commands to be transmitted to two valves of the plurality of valves 23.

The error reduction message 78 may be an error detection field, error correction field, or both that may be processed by the processor 52 of the valve controller 26 when the valve controller (e.g., the receiver 48) receives the encoded message 70. For example, the processor 52 may compare an instruction message of the one or more instruction messages 76 with a checksum indicated by the error reduction message 78. Suitable error reduction messages may include a Huffman Code, a cyclic redundancy check (CRC), a checksum, and the like. While adding the error reduction message 78 may add additional bits to the encoded message 70, the error reduction message 78 may reduce or eliminate repetition of the encoded message 70, and thus, an encoded message 70 with an error reduction message 78 may ultimately transmit less data than a repeated sequence of the encoded messages 70 that is used in existing valve control systems. Indeed, in existing valve systems, a processor of a conventional valve controller may only execute an instruction once the instruction has been received a predetermined number of times, and verified by the processor (e.g., via a comparison of each instruction), before the instruction is implemented by the conventional valve controller. It should be noted that, at least in some examples, the error reduction message 78 may be computed based on a plurality of instruction messages and/or a plurality of repetitions, for instance two repetitions, of the instruction messages 76. Further, the encryption message 80 may generally protect the EM signal 54 from interference and/or being received or directed to an unintended source.

In some examples, the encoded message 70 (e.g., the one or more instruction messages 76) may also include data indicative of instructions for one or more valves of the plurality of valves 23 to undergo "radio silence." As used herein, "radio silence" refers to maintaining the respective positions of one or more valves of the plurality of valves 23 in the absence of the EM signal 54 for a target time period. For example, the encoded message 70 may include data (e.g., one bit) that may be decoded by the valve controllers 26 indicating that an associated valve 23 should undergo a radio silence mode. It should be noted that all of the valve controllers may be configured to decode this instruction, such that each valve controller 26 may cause the associated valve 23 to initiate the radio silence mode when the one or more instruction messages 76 indicate that the associated valve 23 should begin the radio silence mode. In the radio silence mode, the valve controller 26 may maintain the respective positions of the associated valve 23 regardless of whether the EM signal 54 is received by the receiver 48 of the valve controller 26 and/or whether an invalid EM signal 54 (e.g., an EM signal 54 unable to be decoded by the valve controller 26) is received by the valve controller 26. The radio silence mode may initiate a timer, such that the valve controller 26 maintains the position of the associated valve 23 for a target time period (e.g., 1 minute, 10 minutes, 30 minutes, 1 hour, 5 hours, or more than 5 hours). In some examples, the valve controller 26 may deactivate the radio silence mode upon expiration of the target time period and/or upon receipt of the EM signal 54 indicating that the radio silence mode should be discontinued. Additionally or alternatively, the valve controller 26 may be configured to adjust the associated valve 23 to a default position (e.g., a closed position) upon expiration of the target time period in the absence of the EM signal 54. The radio silence mode may enable the EM signal 54 to be interrupted, such that a task (e.g., perforation, maintenance on the transmitter subsystem 28 and/or antenna 44) may be performed on one wellbore, while enabling valves associated with another wellbore to continue enabling fluid flow through the corresponding closure device 12.

In any case, the valve controller 26 decodes the encoded message 70, such as by an autocorrelation function or other suitable methods, to generate the decoded message 68. The decoded message 68 includes instructions to be executed by the processor 52 of the valve controller 26 to adjust a respective position of the associated valve 23.

Figure 4:
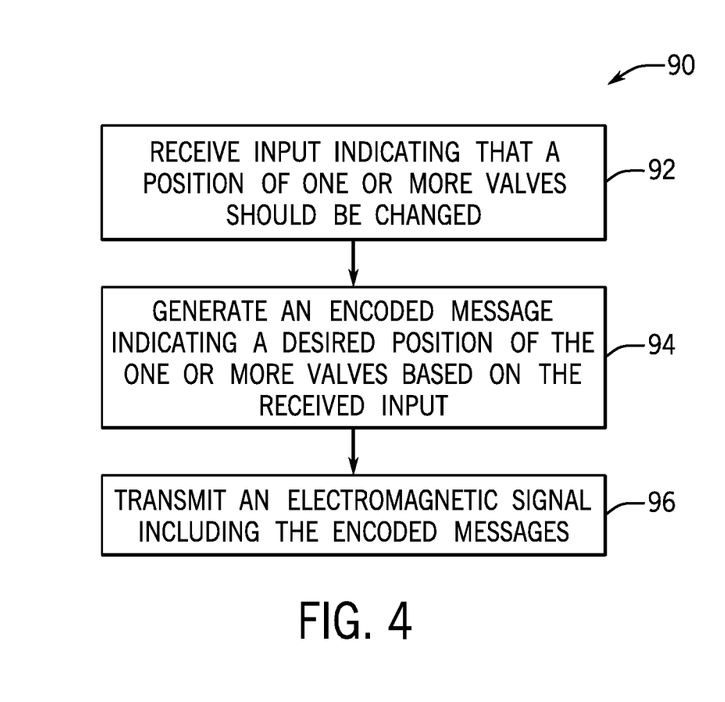
FIG. 4 is a flow chart of an example of a process for decoding the encoded message from the EM signal to control the valve of the downhole closure device, in accordance with an aspect of the present disclosure.

With the foregoing in mind, FIG. 4 is a flow chart illustrating an example of a process 90 for generating and transmitting the EM signal 54 including the encoded message 70 indicative of commands for actuating the respective positions of the plurality of valves 23 of the valve control system 38. It is to be understood that the steps discussed herein are merely exemplary, and certain steps may be omitted or performed in a different order than the order described below. In some examples, the process 90 may be stored in the memory 32 and executed by the processor 30 of the transmitter subsystem 28. In other examples, the process 90 may be stored in other suitable memory and executed by another suitable processing circuit.

As shown in the illustrated example of FIG. 4, at block 92, the processor 30 receives the input 72 indicating that the position of one or more of the plurality of valves should be adjusted. In some embodiments, the input 72 may be instructions provided by an operator (e.g., via the input/output port 37, the input/output device 62, received remotely from a suitable electronic device, and the like). For example, the input 72 may indicate that all valves 23 in an area (e.g., including one or more wellbores 16) should be closed. In some embodiments, the input 72 may be based on feedback indicative of a condition with the wellbore 16 from the sensors 56. For example, the feedback may include a pressure and/or a temperature within the wellbore 16 and/or the flowline 42 of the closure device 12, a spectroscopic measurement associated with a presence and/or absence of a component (e.g., hydrocarbon, hydrogen sulfide ($H_2S$), or both) within the wellbore 16, another suitable operating parameter, or any combination thereof. In some examples, the processor 30 may compare the feedback to one or more threshold values. For example, the processor 30 may determine that a pressure within the wellbore is above a first threshold value, indicating that fluid within the wellbore 16 may flow toward the surface. In any case, at block 94, the processor 30 may generate the encoded message 70 included in the EM signal 54 based on the feedback and/or the user input. Further, at block 96, the EM signal 54 having the encoded message 70 may be transmitted via the antenna 44 to the receiver 48 of the valve controller 26. As discussed above with respect to FIG. 3, the encoded message 70 may include a synchronization message 74, one or more instruction messages 76, an error reduction message 78, and/or an encryption message 80.

In some examples, the input 72 received at block 92 may indicate a region within the wellbore 16 or along the flowline 42 associated with the measured condition (e.g., the temperature, the pressure, or any combination thereof). As such, the encoded message 70 generated by the processor 30 may also indicate a subset of closure devices 12 and their associated valves 23 to actuate. Further still, the valve control system 38 may be configured to receive feedback from sensors 56 in multiple wellbores 16. As such, the encoded message 70 may be configured to include instructions to actuate valves of the plurality of valves 23 positioned within a specific wellbore 16 and/or to maintain the respective positions of the remaining valves of the plurality of valves 23 positioned in other wellbores 16.

Figure 5:
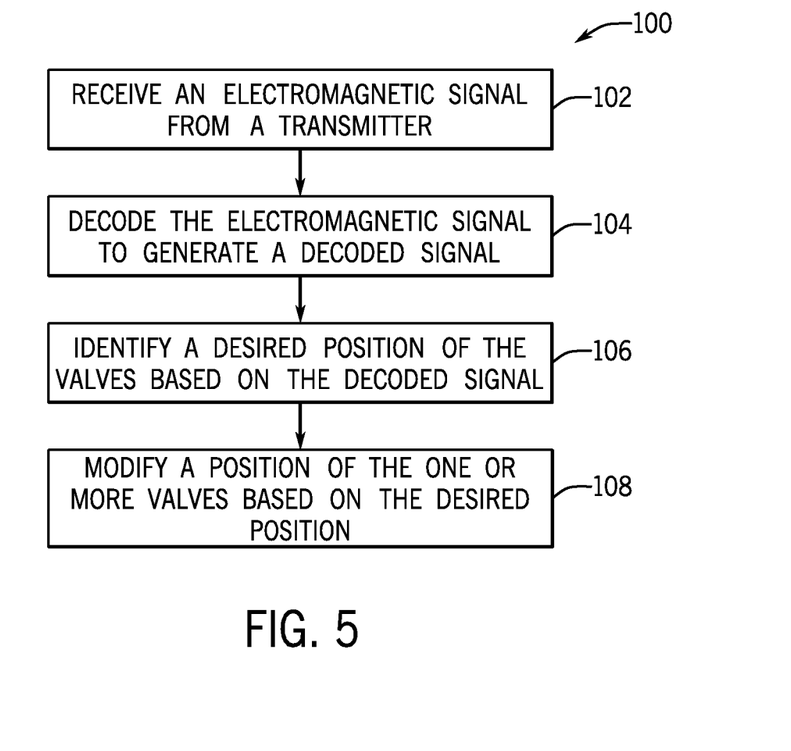
FIG. 5 is a flow chart of an example for controlling operation of multiple valves each having respective valve controller via a transmitter of the downhole closure device, in accordance with an aspect of the present disclosure.

FIG. 5 is a flow chart illustrating an example of a process 100 for operating the valve control system 38. It is to be understood that the steps discussed herein are merely exemplary, and certain steps may be omitted or performed in a different order than the order discussed herein. In some examples, the process 100 may be stored in the memory 50 of each of the valve controllers 26 and executed by the processor 52 of the valve controllers 26. In other examples, the process 100 may be stored in other suitable memory and executed by another suitable processing circuit associated with the valve control system 38.

As shown in the illustrated example of FIG. 5, at block 102, the receiver 48 of the valve controller 26 receives the EM signal 54 from the antenna 44. As discussed above, the EM signal 54 having the encoded message 70 is transmitted to each of the valve controllers 26 (e.g., valve controllers 26 associated with a specific valve and/or valve controllers associated with a specific wellbore 16). In other examples, the EM signal 54 may be transmitted at one or more frequencies. For example, the antenna 44 may transmit the EM signal 54 having the encoded message 70 at different frequencies, where each frequency includes a different instruction message 76 that is associated with a respective valve controller 26. As such, the valve controller 26 may receive or process the EM signal 54 having a particular frequency.

Once the receiver 48 of the valve controller 26 receives the EM signal 54, the processor 52 decodes the encoded message 70 of the EM signal 54, as shown at block 104. For example, the memory 50 may include a look-up table that may include various codes and/or information that may be included in the encoded message 70 and is associated with particular instructions for adjusting a respective valve 23. Thus, the processor 52 may compare the encoded message 70 (e.g., the one or more instruction messages 76) to the look-up table to generate the decoded message 68. In some examples, the processor 52 may additionally use the synchronization message 74, the error reduction message 78, the encryption message 80, or any combination thereof to generate the decoded message 68. At block 106, the processor 52 identifies a target position of the valve 23 associated with each valve controller 26 based on the decoded message 68. Additionally or alternatively, the processor 52 may delay actuation of the plurality of valves 23 (e.g., as shown in block 108) until the one or more instructions messages 76 have been received a threshold number of times. Once the processor 52 has determined the target position of the associated valve at block 106, the processor 52 adjusts the position of the valve 23, as shown at block 108.

Accordingly, the present disclosure relates to a valve control system to be used with one or more closure devices disposed in one or more wellbores. The valve control system includes a transmitter that transmits an encoded message via EM signals. Further, the valve control system includes one or more closure devices that each include a valve controller that receives the EM signals (e.g., via a respective receiver) and decodes the encoded message of the EM signals (e.g., via a processor). For example, the processor may identify instructions to actuate the valve of a particular closure device based on the decoded message and adjust the position of the valve based on the instructions identified within the decoded message. In general, the transmitter may be disposed on a surface above the geological formation above the wellbore. The transmitter may be configured to transmit EM signals that are encoded with a message that is indicative of target positions for each of the valves associated with each of the one or more closure devices. In some examples, the valve control system may generate the EM signals in response to input provided by a user. Additionally or alternatively, the valve control system may generate the EM signals that include the encoded message based on sensor data acquired from the wellbore indicative of a condition within the wellbore. In some examples, the encoded message may include a synchronization message that indicates when and/or where the valve controller should begin decoding the encoded message. In some examples, the encoded message may include an error detection and/or error correction field that increases the reliability of the valve controller to decode the message without having to repeat the message. In this way, the valve control system of the present disclosure may reduce the processing time of the valve controller for decoding the encoded messages, which may reduce an actuation time for adjusting the valves associated with the one or more closure devices.

The specific examples described above have been shown by way of example, and it should be understood that these examples may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A system, comprising:
a plurality of first fluid valves;
a plurality of second fluid valves, wherein the first and second fluid valves are disposed in one or more wellbores extending beneath a well site surface and are configured to prevent the flow of a formation fluid from propagating toward the well site surface;
a plurality of first valve controllers each communicatively coupled to a corresponding one of the first fluid valves within the one or more wellbores;
a plurality of second valve controllers each communicatively coupled to a corresponding one of the second fluid valves within the one or more wellbores; and
a transmitter disposed at the well site surface and configured to simultaneously:
transmit a first electromagnetic signals at a first frequency associated with the first valve controllers; and
transmit a second plurality of electromagnetic signals at a second frequency different from the first frequency and associated with the second valve controllers;
wherein the first plurality of electromagnetic signals comprises a plurality of first instruction messages that include first data indicative of respective target positions of the first fluid valves, and wherein the first plurality of electromagnetic signals periodically include a first electromagnetic signal comprising a synchronization message indicating when or where within the first electromagnetic signal to begin decoding the first electromagnetic signal;
wherein the second plurality of electromagnetic signals comprises a plurality of second instruction messages that include second data indicative of respective target positions of the second fluid valves, and wherein the second plurality of electromagnetic signals periodically include a second electromagnetic signal comprising a synchronization message indicating when or where within the second electromagnetic signal to begin decoding the second electromagnetic signal;
wherein the first valve controllers each comprise a first receiver, a first processor, and a first tangible, non-transitory, machine-readable media comprising first instructions configured to be executed by the corresponding first processor;
wherein the first instructions are configured to cause each first valve controller to:
receive the first electromagnetic signal from the transmitter via the corresponding first receiver;
identify the first data indicative of the respective target positions of the first fluid valve corresponding to that first valve controller by decoding the first electromagnetic signal;
modify the position of the first fluid valve corresponding to that first valve controller based on the first data; and then
maintain radio silence for a first target time period, wherein when in radio silence, each first valve controller maintains the corresponding first fluid valve in position regardless of whether another electromagnetic signal is received by any of the first valve controllers;
wherein the second valve controllers each comprise a second receiver, a second processor, and a second tangible, non-transitory, machine-readable media comprising second instructions configured to be executed by the corresponding second processor; and
wherein the second instructions are configured to cause each second valve controller to:
receive the second electromagnetic signal from the transmitter via the corresponding second receiver;
identify the second data indicative of the respective target positions of the second fluid valve corresponding to that second valve controller by decoding the second electromagnetic signal;
modify the position of the second fluid valve corresponding to that second valve controller based on the second data; and then
maintain radio silence for a second target time period, wherein when in radio silence, each second valve controller maintains the corresponding second fluid valve in position regardless of whether another electromagnetic signal is received by any of the second valve controllers.

2. The system of claim 1, wherein the first electromagnetic signal comprises a first synchronization message, wherein the first instructions are configured to identify the first data indicative of the respective target position of the respective first fluid valve associated with the first valve controller based on the first synchronization message, wherein the second electromagnetic signal comprises a second synchronization message, and wherein the second instructions are configured to identify the second data indicative of the respective target position of the respective second fluid valve associated with the second valve controller based on the second synchronization message.

3. The system of claim 2, wherein the plurality of first instruction messages are addressed to each first valve controller in a first predetermined order, wherein each first valve controller is configured to detect a position of the first instruction message addressed to that first valve controller based on the first synchronization message, wherein the plurality of second instruction messages are addressed to each second valve controller in a second predetermined order, and wherein each second valve controller is configured to detect a position of the second instruction message addressed to that second valve controller based on the second synchronization message.

4. The system of claim 2, wherein the first and second synchronization messages each comprise data indicative of a Barker Code, Gold Code, or both.

5. The system of claim 1, comprising a valve control system communicatively coupled to the transmitter and each of the first and second valve controllers, wherein the valve control system is configured to:
receive feedback indicative of an operating parameter of one or more of the one or more wellbores; and
generate at least one of the first and second electromagnetic signals in response to a comparison of the feedback to a threshold value.

6. The system of claim 1, wherein the first electromagnetic signal comprises a first error detection message, wherein the second electromagnetic signal comprises a second error detection message, wherein the first receiver of each first valve controller is configured to receive the first error detection message and enable the first instructions to accurately identify the first data based on the first error detection message, and wherein the second receiver of each second valve controller is configured to receive the second error detection message and enable the second instructions to accurately identify the second data based on the second error detection message.

7. The system of claim 1, further comprising a valve control system communicatively coupled to the transmitter and each of the first and second valve controllers, wherein:
the valve control system is configured to:
receive feedback indicative of an operating parameter of one or more of the one or more wellbores; and
generate at least one of the first and second electromagnetic signals in response to a comparison of the feedback to a threshold value;
the first electromagnetic signal comprises a first synchronization message, a first error reduction message, and a first error detection message; and
the second electromagnetic signal comprises a second synchronization message, a second error reduction message, and a second error detection message.

8. The system of claim 1, further comprising sensors positioned on a wellhead disposed at a well site surface and communicatively coupled to the valve controllers.

9. The system of claim 1, wherein the first valve controllers are configured to deactivate the radio silence upon expiration of the first target time period.

10. The system of claim 1, wherein the first valve controllers are configured to adjust the corresponding first fluid valve to a default position upon expiration of the first target time period.

11. A method, comprising:
receiving a first plurality of electromagnetic signals at a first frequency via a first valve controller of a first well closure device, wherein the first plurality of electromagnetic signals comprises a plurality of first instruction messages including first data indicative of a first target position of a first valve of the first well closure device, and wherein the first plurality of electromagnetic signals periodically include a first electromagnetic signal comprising a synchronization message indicating when or where within the first electromagnetic signal to begin decoding the first electromagnetic signal;
receiving a second plurality of electromagnetic signals at a second frequency, different from the first frequency, via a second valve controller of a second well closure device, wherein the second plurality of electromagnetic signals comprises a plurality of second instruction messages including second data indicative of a second target position of a second valve of the second well closure device, wherein the plurality of second electromagnetic signals periodically include a second electromagnetic signal comprising a synchronization message indicating when or where within the second electromagnetic signal to begin decoding the second electromagnetic signal, wherein the first and second well closure devices are disposed in one or more wellbores extending beneath a well site surface and are configured to prevent the flow of a formation fluid from propagating toward the well site surface, wherein the first and second electromagnetic signals are transmitted simultaneously from a transmitter disposed at the well site surface, wherein the first instruction message is provided in a predetermined order in the first electromagnetic signal, and wherein the second instruction message is provided in a predetermined order in the second electromagnetic signal;
identifying, via a first processor of the first valve controller, a first synchronization message of the first electromagnetic signal;
identifying, via a second processor of the second valve controller, a second synchronization message of the second electromagnetic signal;
decoding, via the first processor of the first valve controller, the first electromagnetic signal to output a first decoded message based on the first synchronization message, wherein the decoding includes detecting a first location of the first instruction message in the first electromagnetic signal based on the first synchronization message;
further decoding, via the second processor of the second valve controller, the second electromagnetic signal to output a second decoded message based on the second synchronization message, wherein the further decoding includes detecting a second location of the second instruction message in the second electromagnetic signal based on the second synchronization message;
identifying, via the first processor of the first valve controller, the first target position of the first valve of the first well closure device based on the first decoded message;

identifying, via the second processor of the second valve controller, the second target position of the second valve of the second well closure device based on the second decoded message;

outputting, via the first processor of the first valve controller, a first actuation signal to adjust a position of the first valve toward the first target position based on the first decoded message, and then maintain radio silence for a first target time period, wherein when in radio silence, the first valve controller maintains the first valve in the first target position regardless of whether another electromagnetic signal is received by the first valve controller;

outputting, via the second processor of the second valve controller, a second actuation signal to adjust a position of the second valve toward the second target position based on the second decoded message, and then maintain radio silence for a second target time period, wherein when in radio silence, the second valve controller maintains the second valve in the second target position regardless of whether another electromagnetic signal is received by the second valve controller.

12. The method of claim 11, comprising:

identifying, via the first processor of the first valve controller, a first error reduction message of the first electromagnetic signal;

identifying, via the second processor of the second valve controller, a second error reduction message of the second electromagnetic signal;

decoding, via the first processor of the first valve controller, the first electromagnetic signal to output the first decoded message based on the first synchronization message and the first error reduction message; and decoding, via the second processor of the second valve controller, the second electromagnetic signal to output the second decoded message based on the second synchronization message and the second error reduction message.

13. The method of claim 11, wherein the first and second synchronization messages each comprise a fine synchronization portion having data indicative of an autocorrelation algorithm with modulated bits.

14. The method of claim 11, wherein the first electromagnetic signal comprises data having at least three bits indicative of the first target position of the first valve, and wherein the second electromagnetic signal comprises data having at least three bits indicative of the second target position of the second valve.

15. A valve control system, comprising:

one or more non-transitory, machine-readable media comprising instructions configured to be executed by a processor, wherein the instructions are configured to cause the processor to:

receive an input indicative of a plurality of first and second target positions of a plurality of corresponding first and second valves, wherein each of the first and second valves is communicatively coupled to a respective first or second valve controller of a plurality of first and second valve controllers, wherein each of the first and second valves is associated with a respective first or second well closure device of a plurality of first and second well closure devices, and wherein each of the first and second well closure devices are disposed in one or more wellbores extending beneath a well site surface, wherein the well closure devices are configured to prevent the flow of a formation fluid from propagating toward the well site surface;

generate, based on the input, a first plurality of electromagnetic signals at a first frequency associated with the first valve controllers, wherein the first plurality of electromagnetic signals comprises a plurality of first instruction messages, wherein the first instruction messages include first data indicative of the plurality of first target positions of the plurality of first valves, and wherein the first plurality of electromagnetic signals periodically include a first electromagnetic signal comprising a synchronization message indicating when or where within the first electromagnetic signal to begin decoding the first electromagnetic signal;

generate, based on the input, a second plurality of electromagnetic signals at a second frequency different from the first frequency and associated with the second valve controllers, wherein the second plurality of electromagnetic signals comprises a plurality of second instruction messages, wherein the second instruction messages include second data indicative of the plurality of second target positions of the plurality of second valves, and wherein the second plurality of electromagnetic signals periodically include a second electromagnetic signal comprising a synchronization message indicating when or where within the second electromagnetic signal to begin decoding the second electromagnetic signal;

transmit, from a transmitter disposed at the well site surface, the first electromagnetic signal to each first valve controller of the plurality of first valve controllers, wherein the first electromagnetic signal includes instructions for each first valve controller to maintain radio silence for a first target time period, wherein when in radio silence, each first valve controller maintains the corresponding first valve in the first target position regardless of whether another electromagnetic signal is received by the first valve controller; and transmit, from the transmitter simultaneously with the transmission of the first electromagnetic signal, the second electromagnetic signal to each second valve controller of the plurality of second valve controllers, wherein the second electromagnetic signal includes instructions for each second valve controller to maintain radio silence for a second target time period, wherein when in radio silence, each second valve controller maintains the corresponding second valve in the second target position regardless of whether another electromagnetic signal is received by the second valve controller.

16. The valve control system of claim 15, wherein each first valve controller is configured to:

receive the first electromagnetic signal via a first receiver of that first valve controller;

decode the first electromagnetic signal to generate a first decoded message; and output a first actuation signal to adjust a position of one of the first valves associated with that first valve controller toward a respective one of the first target positions based on the first decoded message; and wherein each second valve controller is configured to:

receive the second electromagnetic signal via a second receiver of that second valve controller;

decode the second electromagnetic signal to generate a second decoded message; and output a second actuation signal to adjust a position of one of the second valves associated with that second valve controller toward a respective one of the second target positions based on the second decoded message.

17. The valve control system of claim 16, wherein:

the first electromagnetic signal comprises a first synchronization message;

the first instruction messages are provided in a predetermined order within the first electromagnetic signal;

each first valve controller is configured to detect the location of the plurality of first instruction messages based on the first synchronization message and to identify the first data indicative of the plurality of first target positions of the plurality of first valves included in the first electromagnetic signal;

the second electromagnetic signal comprises a second synchronization message;

the second instruction messages are provided in a predetermined order within the second electromagnetic signal; and each second valve controller is configured to detect the location of the plurality of second instruction messages based on the second synchronization message and to identify the second data indicative of the plurality of second target positions of the plurality of second valves included in the second electromagnetic signal.

18. The valve control system of claim 15, wherein the input is provided by an operator via an input/output device.

19. The valve control system of claim 15, wherein the input is feedback provided by one or more sensors, and wherein the instructions are configured to cause the processor to:

compare the feedback to a threshold value; and generate at least one of the first and second electromagnetic signals based on comparison of the feedback to the threshold value.

20. The valve control system of claim 19, wherein the feedback provided by the one or more sensors is indicative of an operating condition within one or more of the one or more wellbores, an operating condition at the well site surface, or both.

* * * * *